March 8, 1938.  F. P. RYDER  2,110,242
BEAN SNIPPING MACHINE
Filed Jan. 10, 1933  4 Sheets-Sheet 1
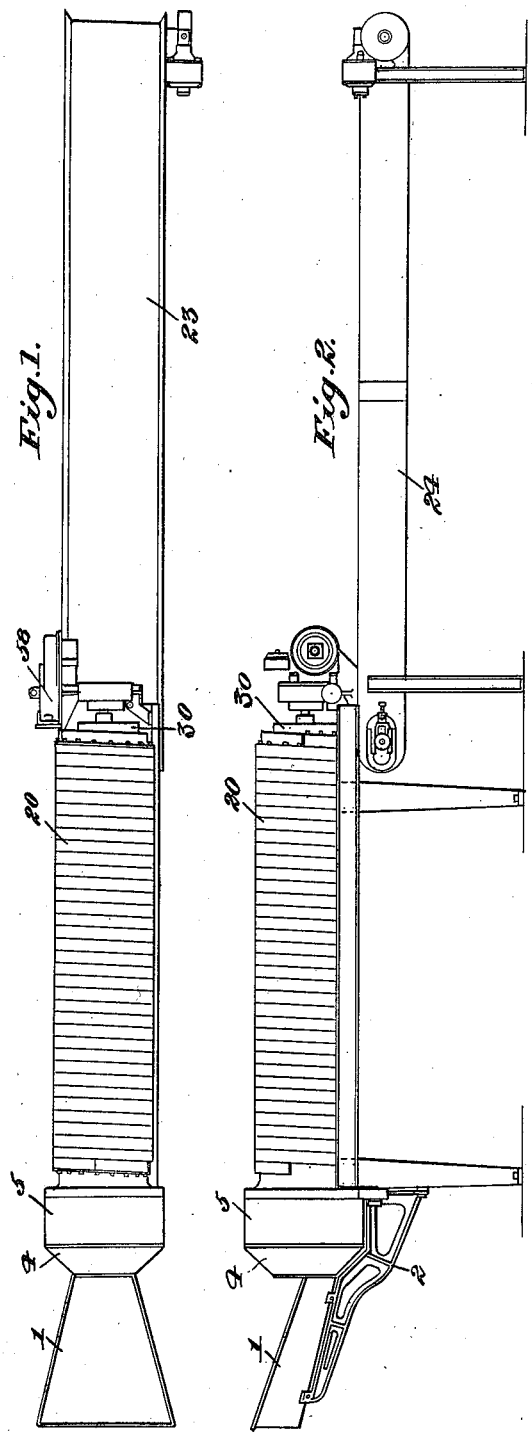
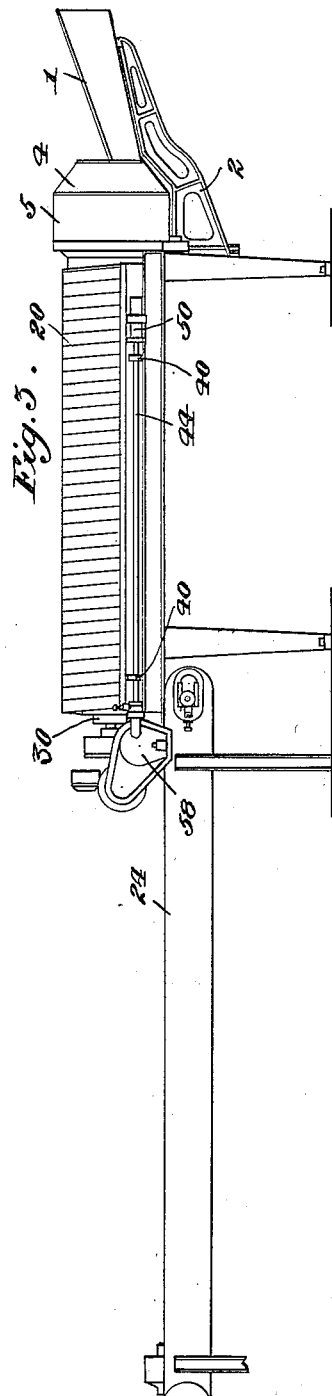
Inventor:
Frank P. Ryder,

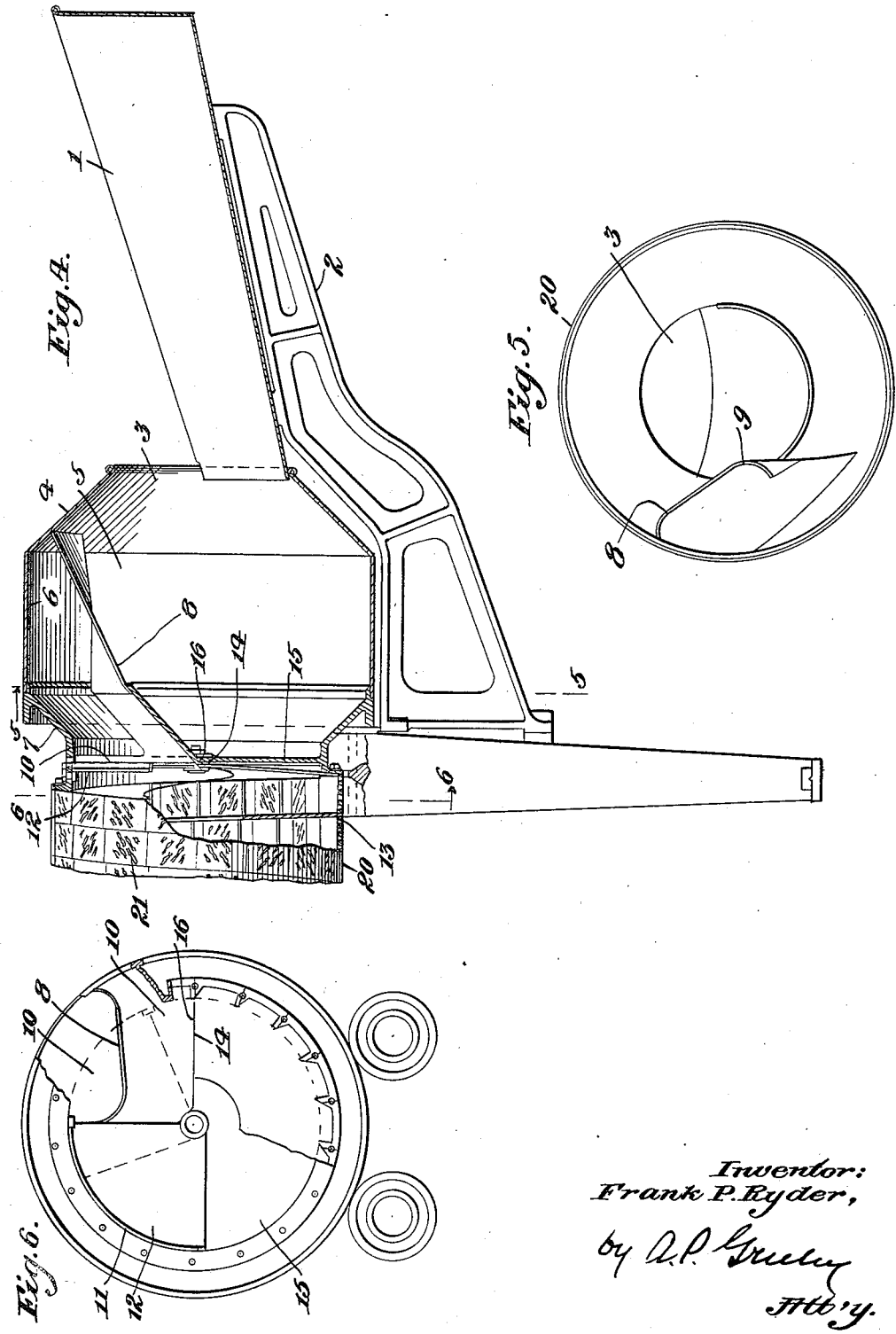

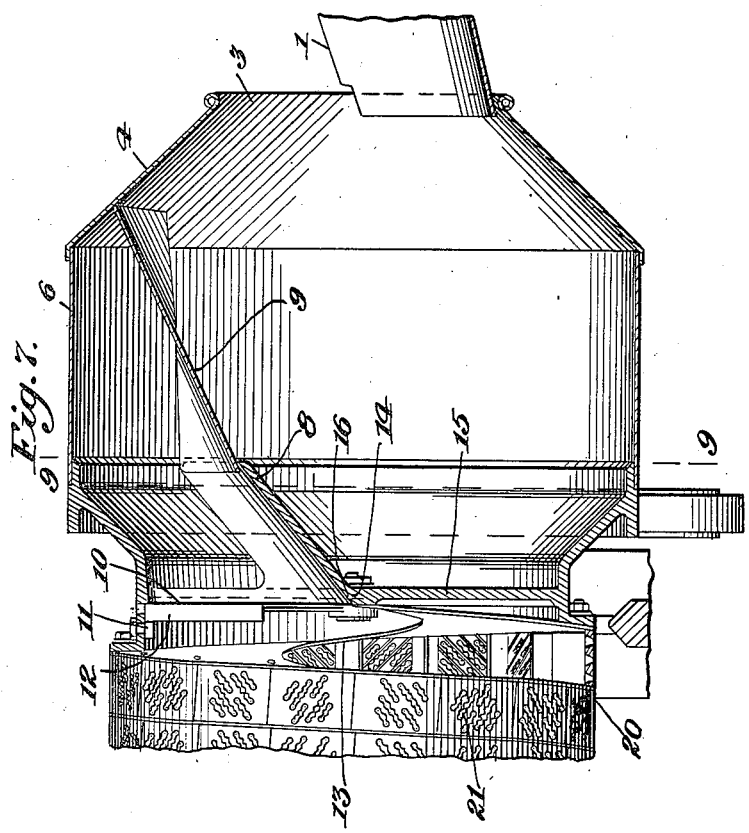
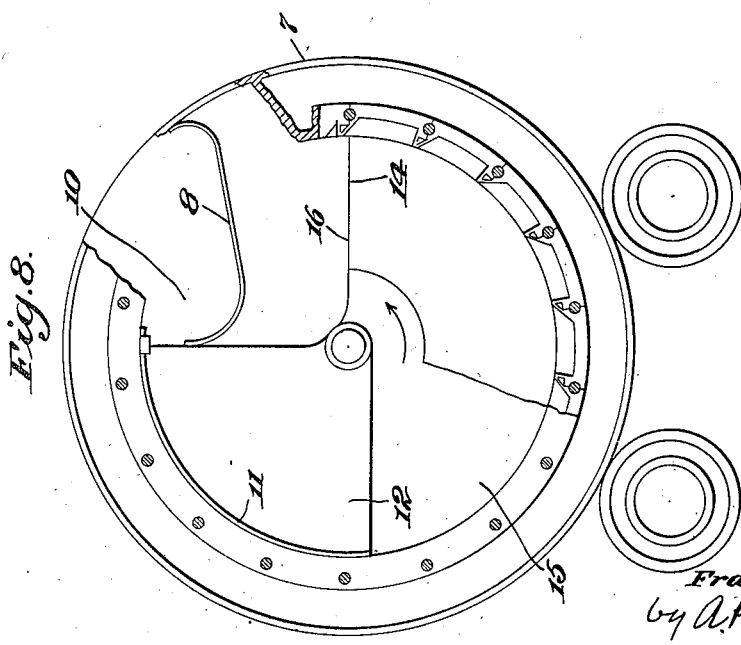

March 8, 1938.   F. P. RYDER   2,110,242
BEAN SNIPPING MACHINE
Filed Jan. 10, 1933   4 Sheets-Sheet 4

Inventor:
Frank P. Ryder,
by A. P. Greeley
Att'y.

Patented Mar. 8, 1938

2,110,242

UNITED STATES PATENT OFFICE 2,110,242

BEAN SNIPPING MACHINE

Frank P. Ryder, Niagara Falls, N. Y.; Stephen M. Ryder, executor of said Frank P. Ryder, deceased, assignor to Chisholm-Ryder Company, Inc., Niagara Falls, N. Y., a corporation of New York Application January 10, 1933, Serial No. 651,032

10 Claims. (Cl. 221—123)

My invention relates to machines for snipping string beans, that is, for cutting off the blossom and stem ends preliminary to canning them. Machines for this purpose, known as Urschel bean snippers are extensively used by canners. Such machines embody the construction disclosed in U. S. patents, Nos. 1,256,491 and 1,256,492, issued Feb. 12, 1918, on applications of Wm. E. Urschel, and comprise a cylindrical shell or drum having numerous perforations and arranged to rotate on a horizontal axis having within the shell or drum a feed screw for moving bean pods through from the intake to the delivery end and also having within the shell or drum means for causing bean pods to be directed endwise toward the perforations so that their tips will protrude in position to be cut off by a knife outside the drum.

My invention relates to improvements in the means for feeding string beans to bean snipping machines of the type just described, to improvements in the means for effecting the snipping, and to improvements in means for regulating the delivery of the snipped beans, the object of the invention being to provide means for effecting a uniform rate of feed to distribute and avoid the piling of the snipped beans as they leave the drum and to improve the construction and operation of the snipping mechanism and particularly to provide against injury of the snipping knife.

With the objects above stated and other objects hereinafter explained, my invention consists in the construction and combination of elements hereinafter described and claimed.

Referring to the drawings:—

Figure 1 is a plan view of a complete apparatus for snipping string beans including the improvement of my present invention.

Figure 2 is a side view of the same.

Figure 3 is a view of the side opposite to that shown in Figure 2.

Figure 4 is a central, vertical, sectional view of the feeding mechanism.

Figure 5 is a cross sectional view on line 5—5 of Figure 4.

Figure 6 is a cross sectional view on line 6—6 of Figure 4.

Figure 7 is a longitudinal sectional view of the hopper similar to Figure 4, but on a larger scale.

Figure 8 is a cross sectional view similar to Figure 6 but on a larger scale.

Figure 9:
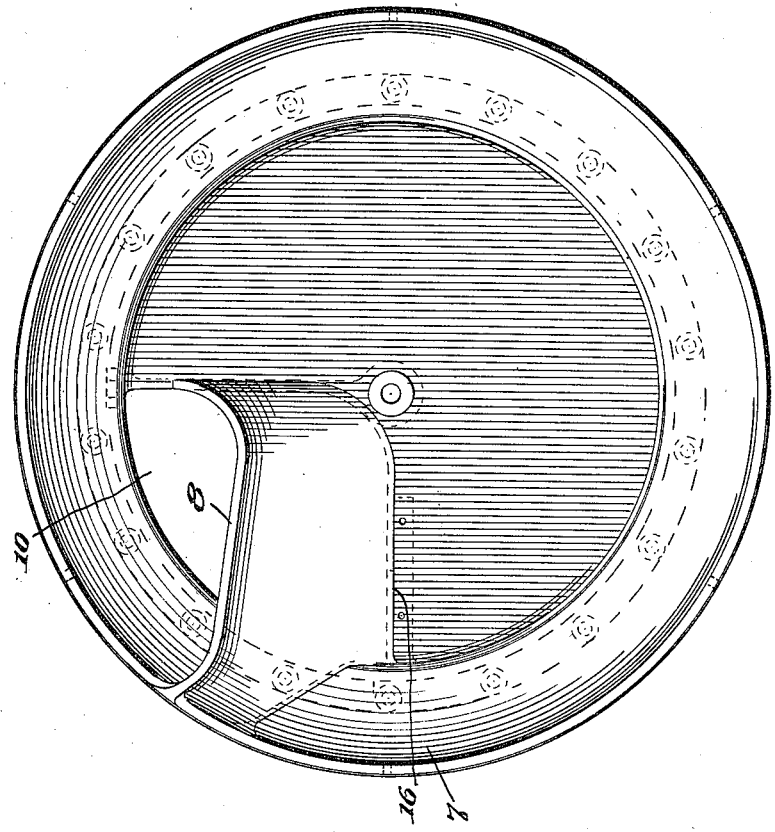
Figure 9 is a cross sectional view on line 9—9 of Figure 7.
Figure 10:
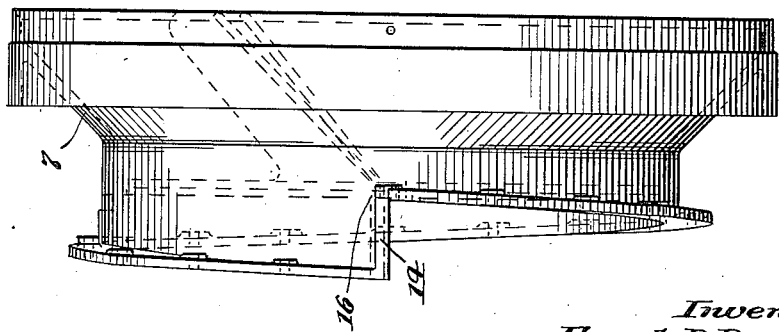
Figure 10 is a side view of the mechanism shown in cross-section in Figure 9.

In the drawings, 1 indicates a trough shaped hopper adapted to receive a quantity of string beans to be snipped preferably of sufficient capacity to receive the contents of a bag containing a bushel. This hopper is supported on a frame 2 and is inclined downward and rearward at such an inclination that beans dumped into it will tend to remain in the hopper until pushed rearward. At its rear end the sides and bottom of the hopper converge and extend into central opening 3 in the head 4 of a rotary hopper 5.

This hopper has a cylindrical portion 6 and the rear end of this cylindrical portion is secured to the larger front end of a frustro-conical casting 7. At the rear end of this casting is a disc-like back plate 15 which is provided with an opening 10 of an area about one fourth the area of the back plate and preferably of quadrant shape, at least with its forward edge 16 on the line of a radius of the back plate. Extending forward from back plate 15 is a lifting fin 8 of somewhat spiral shape, that is, is inclined rearward and downward when moving in upward direction in its rotation with its rear edge in line with edge 16 of opening 10 so that as this lifting fin nears the highest point in its rotation whatever is carried by it will slide by gravity into opening 10. The forward end of this lifting fin extends into the cylindrical mid-portion 6 of the hopper and is so shaped as to scoop up some or all of whatever bean pods may be in the hopper. The lifting fin has a lip 9 at its inner edge. Back of the back plate 15 is an adjustable plate or door 12 held to the inner face of the rim of casting 7 by flange 11. This door corresponds in area and shape with opening 10, preferably somewhat greater in area than a quadrant. By adjusting the position of this door the effective size of opening 10 may be regulated to restrict or increase the amount of beans which will pass through the opening into the bean snipping machine. If the opening is so restricted that only a part of the quantity of beans carried by the lifting fin may pass through it, the surplus will fall over lip 9 back into the mid-section of the hopper. The lifting fin is preferably made of such capacity as to pick up about a pound of bean pods. Regulation of the effective size of opening 10 makes possible the use of the same machine to snip beans of different sizes although smaller bean pods must be fed at a less rate measured by weight or quantity than larger ones.

The casting 7 is so secured to the intake end of the cylindrical shell or drum 20 of the bean snipping machine that the edge 16 of opening 10 will be in line with the end edge 14 of the feed screw 13 of the bean snipping machine by which the bean pods are moved from the intake to the delivery end. The cylindrical shell or drum is provided with numerous perforations, here shown as slots 21, and is provided with means for causing the ends of the beans to be directed towards these perforations so that the tips of their blossom ends and of their stem ends will protrude and be cut off by knife 22 which extends along the side of the shell 20 with its edge in contact with its periphery. The drum 20 is arranged to rotate on an axis approximately horizontal and may be rotated by any convenient means.

It will be seen from the above description that the rotary hopper 5 is so arranged with relation to the feed screw 13 that the discharge end of the lifting fin 8 meets the face of the screw at edge 14 so that the lot of beans discharged from the lifting fin is fed into the space between two helix faces of the screw and the relative arrangement of the lifting fin 8, the opening 10 through which it discharges its contents, the door 12 for regulating the effective size of the opening and the end 14 of the feed screw 13 is such that the edge of the lip of lifting fin 8 is in line with the lower (radial) edge of opening 10, and this lower (radial) edge 14 is in line with the end edge of screw 13. The door is arranged to be movable toward or from edge 14 so that in moving to restrict the effective size of the opening it will move towards edge 14, but of course, without passing it.

The mechanism above described is arranged at the intake end of the bean snipping machine and is concerned with the introduction of the bean pods which are to be snipped. The construction and operation of the bean snipping machine is fully set forth in the Urschel Patent #1,256,492, above referred to and it is sufficient for the purpose of the present application to state that the bean pods in the course of their progress through the machine have both ends snipped and the snipped pods are delivered at the discharge end by the feed screw.

In the arrangement shown the snipped bean pods are discharged onto the feed belt 23 of a picking table 24 by which they are carried forward for a distance sufficient to permit the pods to be inspected and defective or undesirable pods removed and are then discharged into any suitable receptacle.

The rotation of the cylindrical shell 20 of the bean snipping member and the feed screw 13 carried within it, causes the bean pods to move from the intake end of the cylindrical shell to the other end and at this other, or discharge end, and the feed screw will in each rotation discharge a quantity of snipped beans onto the feed belt.

In the operation of the mechanism above described a bag of beans, usually a bushel, is dumped into hopper 1 and rests on the hopper bottom, its inclination not being sufficient to cause the beans to slide down into rotary hopper 5 without being given a push by the operator in charge of the machine. Usually a part only of the bushel should be pushed into opening 3 of the head 4. Beans entering opening 3 will be directed into the mid-portion 6 of the hopper by the inclined portion of head 4. The rotation of the hopper tends to spread the bean pods in this mid-portion and prevents bunching or piling. As the lifting fin comes around it picks up more or less of the beans and raises its load until the edge 16 of opening 10 is on its upward movement so that the beans may slide from the lifting fin through the opening 15 into the space between the opposite faces of the first and second turns of feed screw 13, to be moved through the snipping machine and discharged onto the traveling belt of the picking table.

While the mechanism above described is adapted and intended for use in connection with a bean snipping machine of the Urschel type it is not intended to be restricted to such use or even restricted to use in connection with any bean snipping machine, as the means for feeding the beans to the snipping machine and the means for distributing the snipped beans as they are discharged may be used for feeding articles other than beans to machines adapted to act upon articles or things other than beans to effect some change in them.

Having thus described my invention what I claim is:—

1. A hopper for feeding articles to the inlet end of a drum arranged to rotate on a horizontal axis, secured to and arranged to rotate with the drum, comprising a front end portion having an inlet opening at its centre, a central cylindrical portion and a vertical back end plate having an opening through it having its apex at and extending outward from the centre of the hopper and an inclined lifting fin carried by and extending forward from the back end plate into the central cylindrical portion with its rear edge in line with the forward edge of the opening in the back end plate, the lifting fin being so constructed and arranged that when in the rotation of the hopper the rear edge of the lifting fin comes above the horizontal plane of the axis of rotation and its inclination will be downward and rearward.

2. A hopper for feeding articles to the inlet end of a drum arranged to rotate on a horizontal axis, secured to and arranged to rotate with the drum, comprising a front end portion having an inlet opening at its centre, a central cylindrical portion and a back end plate having an opening through it having its apex at and extending outward from the centre of the hopper, and an inclined lifting fin carried by and extending forward from the back end plate into the central cylindrical portion with its rear edge in line with the forward edge of the opening in the back end plate, the lifting fin being so constructed and arranged that when in the rotation of the hopper the rear edge of the lifting fin comes above the horizontal plane of the axis of rotation its inclination will be downward and rearward, and a stationary hopper having its rear end extending into the central opening in the front portion of the rotating hopper.

3. A hopper for receiving articles to be fed to the inlet end of a drum arranged to rotate on an axis approximately horizontal, secured so as to rotate with the drum, comprising a disc-like end plate against the end of the drum having an opening through it leading to the interior of the drum and having its forward edge on the line of radius of the disc-like end plate, and a lifting fin carried by and extending forward from the back end plate with its rear edge in line with the forward edge of the opening, the fin extending forward at such angle that when in the rotation of the hopper the rear edge of the lifting fin comes above the horizontal plane of the lower edge of the opening in the back plate the fin will be inclined downward toward the opening.

4. A hopper for receiving articles to be fed to the inlet end of a drum arranged to rotate on an axis approximately horizontal, secured so as to rotate with the drum, comprising a disc-like end plate against the end of the drum, and having its forward edge on the line of a radius of the disc-like end plate having an opening through it leading to the interior of the drum, and a lifting fin carried by and extending forward from the back end plate with its rear edge in line with the forward edge of the opening, the fin extending forward at such angle that when in the rotation of the hopper the rear edge of the lifting fin comes above the horizontal plane of the lower edge of the opening in the back plate the fin will be inclined downward toward the opening.

5. A hopper for receiving articles to be fed to the inlet end of a drum arranged to rotate on an axis approximately horizontal, secured so as to rotate with the drum, comprising a disc-like end plate against the end of the drum, having an opening through it leading to the interior of the drum, and a lifting fin carried by and extending forward from the back end plate with its rear edge in line with the forward edge of the opening, the fin extending forward at such angle that when in the rotation of the hopper the rear edge of the lifting fin comes above the horizontal plane of the lower edge of the opening in the back plate the fin will be inclined downward toward the opening, and means carried by the hopper for restricting the area of the opening.

6. A hopper for receiving articles to be fed to the inlet end of a drum arranged to rotate on an axis approximately horizontal, secured so as to rotate with the drum, comprising a disc-like end plate against the end of the drum, having a quadrant shaped opening through it leading to the interior of the drum, and a lifting fin carried by and extending forward from the back end plate with its rear edge in line with the forward edge of the opening, the fin extending forward at such angle that when in the rotation of the hopper the rear edge of the lifting fin comes above the horizontal plane of the lower edge of the opening in the back plate the fin will be inclined downward toward the opening, and means carried by the hopper for restricting the area of the opening, consisting of a plate on the rear face of the end plate.

7. A hopper for receiving articles to be fed to the inlet end of a drum arranged to rotate on an axis approximately horizontal, secured so as to rotate with the drum, comprising a disc-like end plate against the end of the drum, having a quadrant shaped opening through it leading to the interior of the drum, and a lifting fin carried by and extending forward from the back end plate with its rear edge in line with the forward edge of the opening, the fin extending forward at such angle that when in the rotation of the hopper the rear edge of the lifting fin comes above the horizontal plane of the lower edge of the opening in the back plate the fin will be inclined downward toward the opening, and means carried by the hopper for restricting the area of the opening consisting of a quadrant shaped plate adjustably secured on the rear face of the end plate.

8. A hopper for feeding articles to the inlet end of a drum arranged to rotate on a horizontal axis, secured to and arranged to rotate with the drum, comprising a front end portion having an inlet opening at its centre, a central cylindrical portion and a vertical back end plate having a quadrant shaped opening through it, and an inclined lifting fin carried by and extending forward from the back end plate into the central cylindrical portion with its rear edge in line with the forward edge of the opening in the back plate and the lifting fin being so constructed and arranged that when in the rotation of the hopper the rear edge of the lifting fin comes above the horizontal plane of the axis of rotation its inclination will be downward, rearward and towards the axis of the drum, said vertical back plate being provided with means for varying the area of the opening therein.

9. A hopper for feeding articles to the inlet end of a drum arranged to rotate on a horizontal axis, secured to and arranged to rotate with the drum, comprising a front end portion having an inlet opening at its centre, a central cylindrical portion and a vertical back end plate having a quadrant shaped opening through it, an inclined lifting fin provided with a lip carried by and extending forward from the back end plate into the central cylindrical portion with its rear edge in line with the forward edge of the opening in the back plate, and the lifting fin and lip being so constructed and arranged that when in the rotation of the hopper the rear edge of the lifting fin comes above the horizontal plane of the axis of rotation its inclination will be downward and rearward, said vertical back plate being provided with means for varying the area of the opening therein.

10. A hopper for receiving articles to be fed to the inlet end of a drum arranged to rotate on an axis approximately horizontal, secured so as to rotate with the drum, comprising a disc-like end plate against the end of the drum having an opening through it leading to the interior of the drum, said opening having its apex at and extending outward from the centre of the hopper, and a lifting fin provided with a lip carried by and extending forward from the back end of the plate with its rear edge in line with the forward edge of the opening, the fin extending forward at such an angle that when in the rotation of the hopper the rear edge of the lifting fin comes above the horizontal plane of the lower edge of the opening in the back plate the fin will be inclined downward toward the opening.

FRANK P. RYDER.